US006240196B1

(12) United States Patent
Fischer et al.

(10) Patent No.: US 6,240,196 B1
(45) Date of Patent: May 29, 2001

(54) MAIL GENERATION SYSTEM WITH ENHANCED SECURITY BY USE OF MODIFIED PRINT GRAPHIC INFORMATION

(75) Inventors: Meredith B. Fischer, Norwalk; Suzanne N. Grey, New Canaan; Perry A. Pierce, Darien, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/216,345

(22) Filed: Dec. 18, 1998

(51) Int. Cl.$^{7}$ .................................................... G06K 9/00

(52) U.S. Cl. ......................... 382/100; 382/101; 382/112; 399/16

(58) Field of Search .................................... 382/100, 112, 382/101, 165; 380/51; 235/491; 705/401; 399/16

(56) References Cited

U.S. PATENT DOCUMENTS

| | | | | |
|---|---|---|---|---|
| 4,519,311 | | 5/1985 | Lowe | 101/109 |
| 4,660,221 | | 4/1987 | Dlugos | 380/23 |
| 4,831,554 | | 5/1989 | Storace et al. | 364/519 |
| 4,949,381 | | 8/1990 | Pastor | 380/51 |
| 5,168,804 | | 12/1992 | Lee et al. | 101/99 |
| 5,509,109 | | 4/1996 | Kim et al. | 395/114 |
| 5,554,842 | * | 9/1996 | Connell et al. | 235/491 |
| 5,719,948 | * | 2/1998 | Liang | 382/112 |
| 5,781,438 | * | 7/1998 | Lee et al. | 364/464 |
| 5,917,925 | * | 6/1999 | Moore | 382/101 |
| 5,987,441 | * | 11/1999 | Lee et al. | 705/401 |
| 6,081,827 | * | 7/2000 | Reber et al. | 709/200 |

* cited by examiner

*Primary Examiner*—Matthew C. Bella
*Assistant Examiner*—M B Choobin

(57) ABSTRACT

A system for visually detecting unauthorized print value, such as postal indicia on a mail piece. At least one print image is imprinted on a document based upon predetermined relationships and corresponding to a relationship indicator such that the relationship indicator is made known to an authority who may visually inspect the document to detect whether the value was printed by an authorized machine. The relationship indicator may be dependent on valid indicia, geographical location, time of printing, document position, print graphic or like information. The print graphic may also be imprinted in invisible ink for increased security.

25 Claims, 5 Drawing Sheets

MAIL GENERATION SYSTEM WITH ENHANCED SECURITY BY USE OF MODIFIED PRINT GRAPHIC INFORMATION

FIELD OF THE INVENTION

This invention relates to electronic postage meters and metering systems, and particularly to an improved method and system for visually detecting the authenticity of postal indicia printed by a postage metering system and more particularly to an enhanced security system using modified print graphic information. The use herein, also refers to other similar systems, such as parcel registers and tax stamp meters that dispense and account for value, and generally to systems for applying indicia to items and/or labels to verify payment, or other status for that item.

BACKGROUND OF THE INVENTION

Various metering devices have been developed which print unit value such as postage meters, tax stamp meter, carrier payment systems and the like. A postage meter prints an indicia which is representative of money, thus, postage meters may be considered machines for printing money (i.e. symbols having value). Therefore, security has always been considered an important aspect of the postage meter operation. In prior postage meters an indicia is printed by a letter press, using a uniquely engraved die containing posta information such that the resulting imprint would be traceable to the particular meter. Newer postage meters have been developed that include electronically controlled printers such as thermal printers, ink jet or dot matrix pin printers for printing the indicia. One way to secure the validity of particular indicia has been to encode a message in the indicia such a manner that an unauthorized person who does not know the encryption scheme cannot reproduce the appropriate encoding.

Yet more recent postage verification methods utilize bar-code technology taught in U.S. Pat. No. 4,660,221 to Dlugos for System for Printing Encrypted Messages With Bar-Code Representation and assigned to the assignee of the present invention. Furthermore, U.S. Pat. No. 4,949,381 to Pastor for Electronic Indicia in Bit-Mapped Form and assigned to the assignee of the present invention discloses the use of "public key" encryption systems. These systems provide two keys one of which is used to encrypt, but not to decrypt a message and a second key which is used to decrypt the message. These systems, however, have not provided a simple means for postal employees to visually detect the validity of the mail piece.

Various postage-metering systems also have been created in which other a print graphic may be included. The print graphic may be included for aesthetic, advertisement, or information value. The print graphic may be a meter ad, inscription user graphic and/or messaging. the print graphic may also be either customized or standardized. This print material also provides a level of personalization and customization for the user. Inclusion of print graphic is presently available in postal system developed by Pitney Bowes Inc. The print graphic is normally included near the indicia but may appear anywhere on the document. In most open system implementations, a computer generates mail piece information and sends it to a printer. In typical systems, mail piece information may include a destination address, a return address, a proof of postage payment (indicia), and print graphic. The print graphic may also be included in a return address.

U.S. Pat. No. 5,168,804 to Lee et al. for a Postage Meter Having an Automatic Slogan Sub-Module, discloses a postage meter having an automatic slogan sub-module wherein the postage meter has the ability to print an ad slogan or postage class indicia automatically, through the use of print cubes having print faces. The print faces could be independently or selectively rotated to position a respective print face within said print meter slogan aperture. The print face itself, however, can not be altered nor does the slogan provide a means for validating the print means.

Advertising slogans have also been made available to customers as a print die, which has been inserted in a print drum or perhaps as a rotatable slug as shown in U.S. Pat. No. 4,519,311 to Lowe for Auxiliary Printing Device For A Postage Meter. U.S. Pat. No. 4,831,554 to Storace et al. for a Postage Meter Message Printing System assigned to the assignee of the instant application shows a postage meter system for printing slogans and for changing such slogans by way of downloading by telephone from a database at a date center. U.S. Pat. No. 5,509,109 to Kim et al. for a Slogan and Inscription Control System For Mailing Machine, discloses a digital inscription and slogan printing system in which a slogan or inscription is easily changed and yet, which will allow sufficient monitoring to preclude illegal slogans from being printed. However, the ad slogan does not provide a means for validating the mailpiece.

In addition to providing a variety of advertising and messaging slogans, postage metering devices, both closed and, of course, open systems, have included the ability to print variable information through the use of thermal printers, ink jet printers and other printers. This prior art has provided a means for printing ad slogans or other messaging information on the envelope and separately, indicia for validating the postal payment. However, the print message itself has not provided a means for authenticating indicia information.

Generally, each post office is required to inspect the validity of a mail piece at least twice a year. Therefore, significant time may pass between inspections during which fraudulent mail may travel undetected through the postal system. An interest has developed in providing a postal authority with visual detection of fraudulent mail pieces, therefore, enhancing mail piece security.

SUMMARY OF THE INVENTION

Therefore, it is an object of this invention to provide valid indicia authentication through a modified print graphic.

Another object of this invention is to provide additional indicia security through a modified print graphic.

It is yet a further object of this invention to provide enhanced indicia security through a modified print graphic using invisible ink technology.

It is still a further object of this invention to provide a visual means for verifying that the indicia has been printed by an authorized piece of metering equipment.

Other objects and advantages of the present invention will become apparent from the detailed description considered in conjunction with the preferred embodiment of the invention illustrated in the drawings as follows.

The present invention uses modified printed graphic information to enable visual inspection of a document at various points in the mail stream to determine that an indicia has been made by an authorized piece of metering equipment. In addition to containing information for representing money, the indicia may contain a variety of other information, such as, the date, an address indicator, an encryption key and other mail piece information.

The present invention uses the combination of three relationships to accomplish a visual detection of unauthorized indicia. The first relationship is between the indicia and the mail piece. In one example, a digital token is created which represents the document and information contained in the indicia such as the date of mailing, the destination address, register, postage amount, and the like. Other security systems may be also employed. This relationship indicates that the indicia has been printed by an authorized postage meter based upon established postal guidelines.

The second relationship is between a print graphic and an indicia. The second relationship may be variably dependent. In one embodiment of the present invention, the second relationship may dependent upon the indicia itself or the information contained in the digital token indicia. The indicia may include information such as the time, date of mailing, the address, block register, postage amount digital token or the like. This relationship ties the print graphic and the indicia.

The third relationship bases the first relationship upon the second relationship resulting in a relationship where the print graphic is based upon the valid indicia. For example, a print graphic may have a relationship to the document such that the print graphic points to a certain location on the document. In another example, a second print graphic may be generated such that the second print graphic may have a relationship to the first print graphic. In this example the relationship the first print graphic and second print graphic may have is that they point to each other. In another example, the relationship between the first print graphic and the second print graphic is that they are cartoon characters from the same cartoon strip. The cartoon relationship or other relationship may be determined based upon a customer profile.

The of range of possible combinations is vast, therefore, the relationships authenticating a valid mail piece must be recorded such that they could be reference during visual inspection. Such reference indicator may be in the form of a look-up table or the like. The relationship indicator comprises a series of fields representing approval fields. An approval field represents an authorized document. If during visual inspection the mail piece is properly referenced against the look-up table then the mail piece enters the stream of processing. If however, the mail piece does not comply with the reference table then the mail piece is out sorted for further inspection. The print graphic image may also be printed in invisible ink, thus, providing yet another layer of security.

DESCRIPTION OF THE DRAWINGS

References are now made to the drawings wherein like references designates similar elements in the various views and, in which.

DETAILED DESCRIPTION OF THE PRESENT INVENTION

Figure 1:
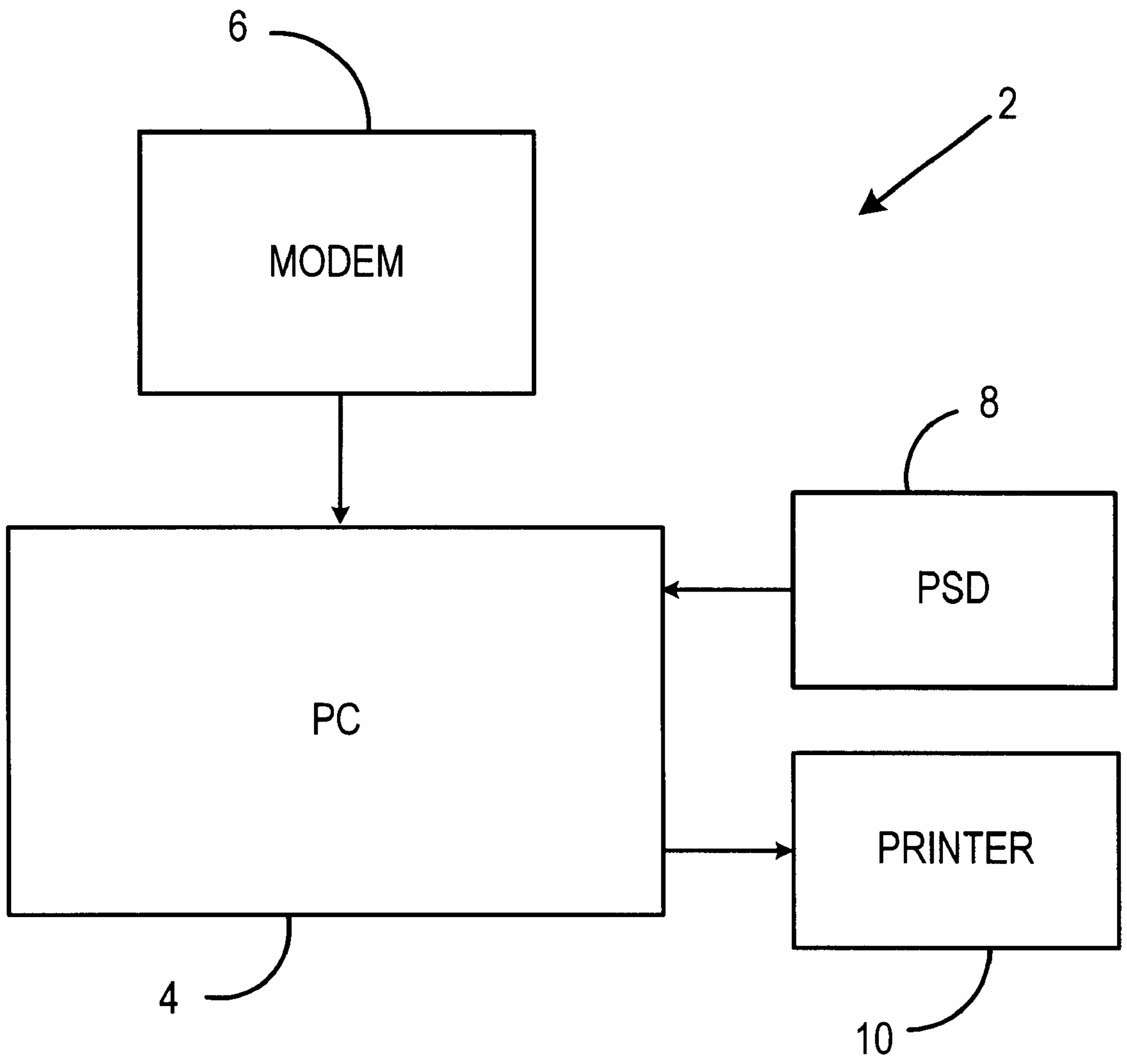
FIG. 1 is block diagram of an open metering system embodying the present invention.

Reference is now made to FIG. 1. An open metering system shown at 2 includes a personal computer having an optional modem 6. Modem 6 may be an internal or external modem. It should be recognized that other forms of communication capable of connecting to the personal computer may be provided. A postal security device 8 is operatively connected to personal computer 4 as is printer 10. A postage security device is a metering or vault arrangement for securely metering value one such system is described in the United States Postal Service Information Indicia Based Program Performance Criteria. Postal security device 8 provides one means for creating the first, relationship between the indicia and the document. Postal security devices are commonly know in the art of security and a description of a postal security device is not necessary for an understanding of this invention. These components may be organized in any of a number of arrangements to enable secure value of printing by printer 10 on a mail piece or other item of material such as a letter or tape or the like.

Figure 2:
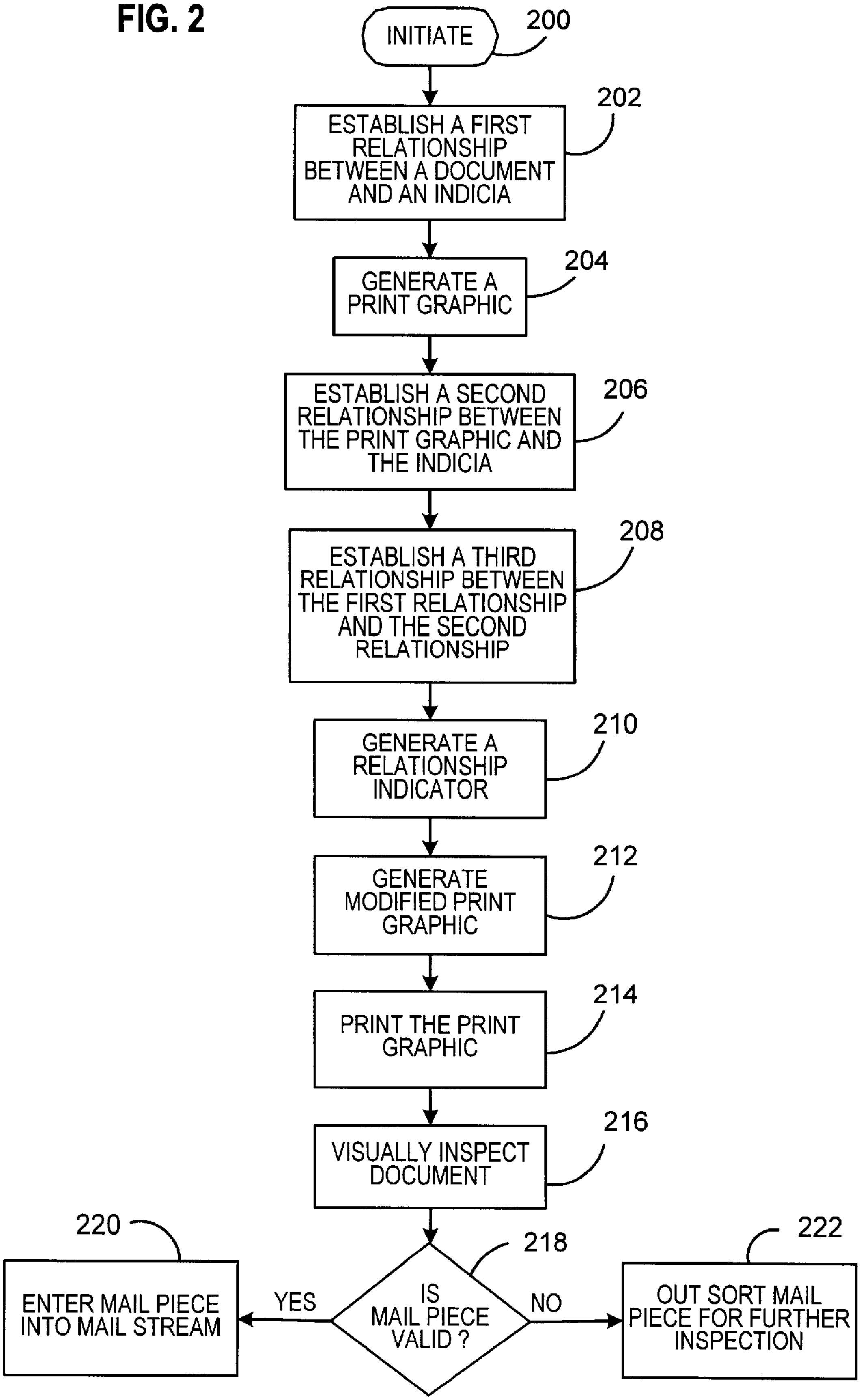
FIG. 2 is a flow chart helpful in understanding the operation of the method of the present invention.

It should be noted that the present invention is equally applicable to various closed system metering wherein a dedicated printer is incorporated within a secure housing or otherwise securely coupled to a metering device and also to various local area network and wide area network metering systems often referenced as virtual and or network metering systems. In these systems, postal security device 8 is located remotely with respect to personal computer 4 Reference is now made to FIG. 2. A program enabling this method is initiated at step 200. The method proceeds to step 202 where a first relationship is established between a document and an indicia. The relationship may be a digital token or the like. A first print graphic is then generated at step 204. This print graphic may be created or selected by a user or automatically generated by the program.

The method continues at step 206 where a second relationship is established. The second relationship is between a first print graphic and an indicia. This second relationship may be based upon the indicia of variables contained in the indicia such as the postage amount, time of day, the date, the geographical area of the mailer, the addressee. Any other parameter significant to the mailing systems security such as included in the digital token may also be utilized.

The method then proceeds to step 208 where a third relationship is established. The third relationship connects the first relationship to the second relationship such that the print graphic is based upon the valid indicia. For example, a print graphic may have a relationship to a certain location on the document such that the print graphic points to that certain location. In another example, a second print graphic may be generated having a relationship to the first print graphic. The relationship may be that the first and second print graphics may be pointing to each other. In another relationship, a user may select the first print graphic to be a cartoon character, wherein the program would automatically generate the second print graphic. The second print graphic may be a second cartoon wherein the relationship is that both cartoon characters are from the same cartoon strip.

Where a first and second print graphic, also known as a split print graphic, is implemented the selection of the second graphic relationship to the first print graphic is under the control of the program and is out of the control of the user of the system. The key of possible relationship combinations authenticating a valid mail pieces is maintained in a relationship indicator, look up table or a similar key and is created in step 210. The relationship indicator comprises a series of fields including approval fields. An approval field represents an authorized document.

Based on one of the foregoing selected techniques, or other similar types of techniques, modified graphics are generated at 212. It should be expressly noted that the modified graphics could be printed by the use of invisible ink at the time of printing. This invisible ink can be of a type, which as printed is invisible but with use of a detection device may be viewed. In yet another form, the invisible ink can be an invisible ink when imprinted, which becomes visible at a later point in time. Thus, the mail piece is not susceptible to a copying attack at the time of preparation but is capable of being visually inspected for security at the time of processing by the carrier service. It also may be available as a visual indicator to the mail delivery personnel.

After the modified print graphic is generated, the print graphic is sent to the printer at 214. The print graphic is then printed at step 216. Visual inspection by postal authority is then accomplished at step 218 to determine the validity of the document. Visual inspection may be accomplished by comparing the mail piece to the reference indicator. At step 218 the method queries whether the mail piece is valid. If the response to the query is yes, the method continues to step 220 where the mail piece enters the mail stream. If, however, the response to the inquiry at step 218 is no, then the method proceeds to step 222 where the mail piece is out sorted for further investigation.

Figure 3:
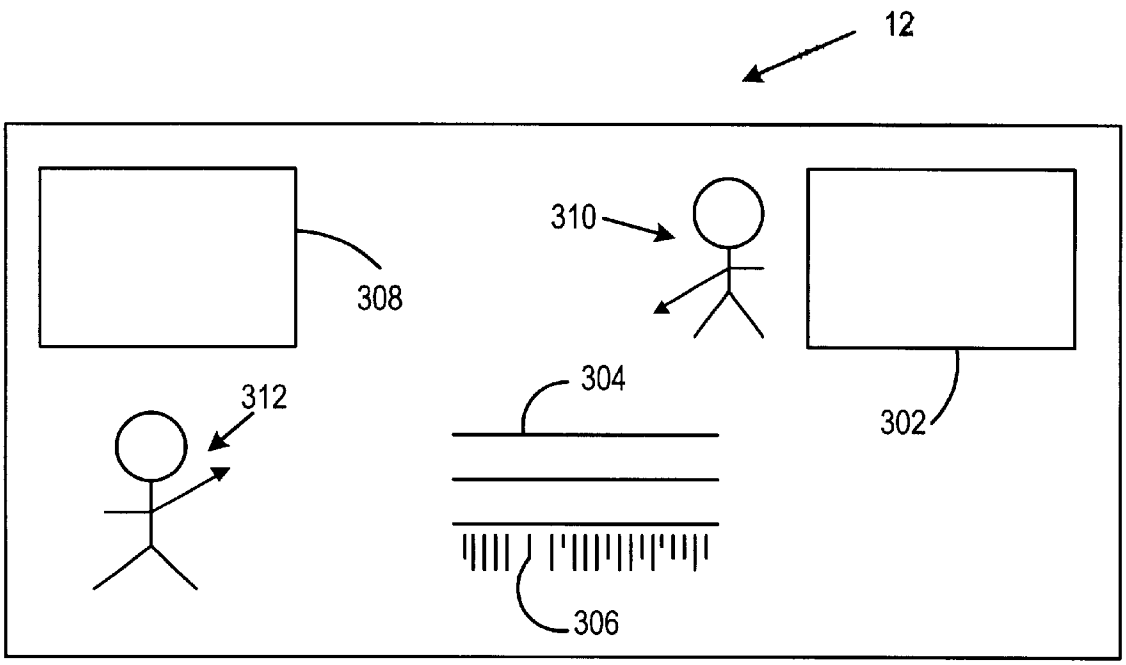
FIGS. 3–8 depict various printed mail pieces of the present invention.

Now turning to FIGS. 3–6 illustrations of the mailpieces depict various results of the printed split meter graphic. Reference is now made to FIG. 3. In FIG. 3, mail piece 12 includes indicia 302, addressee area 304 and postnet bar code 306. A sender address or return address area is provided at 308. Two print graphic or split print graphics are imprinted on mail piece 12. A first print graphic 310, here shown as a stick figure, is imprinted adjacent to the indicia. A second print graphic 312, here shown as a second stick figure, is imprinted in the lower left portion of the mail piece. The orientation of the split print graphics is such that the arms of the stick figures point to each other. It should be expressly recognized that any suitable graphical image can be selected instead of stick figures, as for example, cartoon characters, arrows, sun bursts, rainbows, or the like, which may be oriented in relation to each other to provide the enhanced visual security. Either both or one of the print graphics may be imprinted in invisible ink. By printing only one in invisible ink, a copying attempt may be made more difficult since a potential attacker would not recognize that a second invisible print graphic had been imprinted or, in what area it has been imprinted on the mail piece, making detection more probable. Again, the second print graphic may become visible at a later time or be visible through scanning or radiation or treatment by chemicals or similar detection system.

Figure 4:
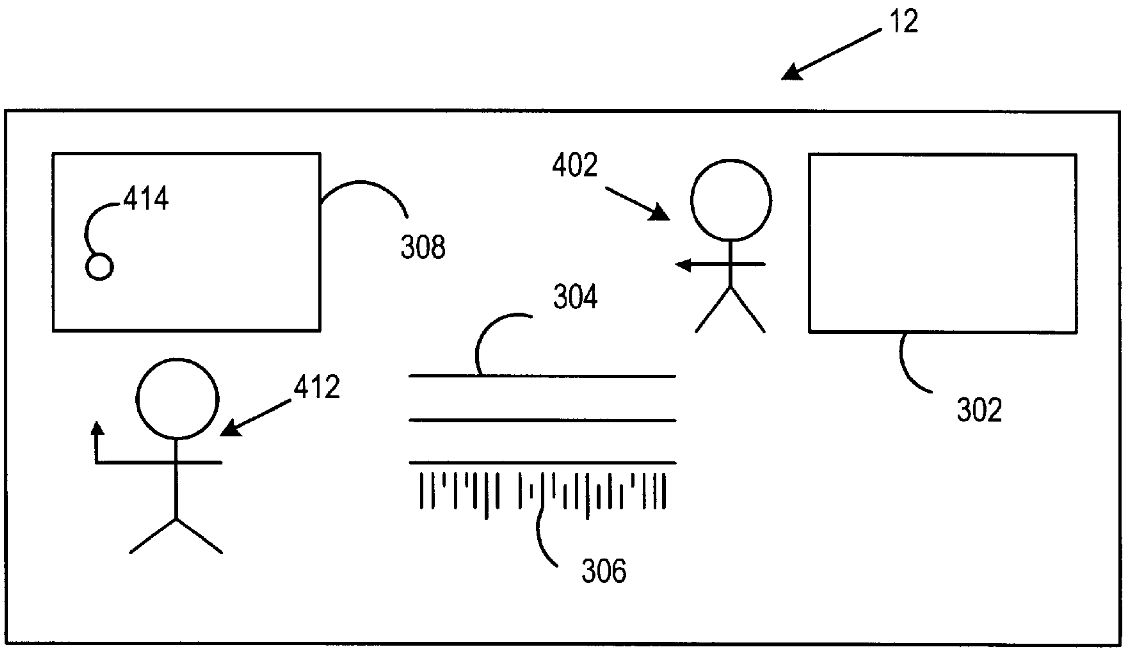

Reference is now made to FIG. 4. A mail piece similar to FIG. 3 is shown; however, the print graphics, here shown as stick figures 402 and 412, are shown pointing to a common point on the mail piece, specifically to a point 414 located within the return address field such as a particular character within the return address field. It should be noted that the characters can be arranged or the print graphics can be arranged in relation to a point on the mail piece or a general area on the mail piece depending upon the system design arrangement. Very wide flexibility may be provided in the arrangements, thus, increasing the level of security since the statistical range of possibilities is increased.

Figure 5:
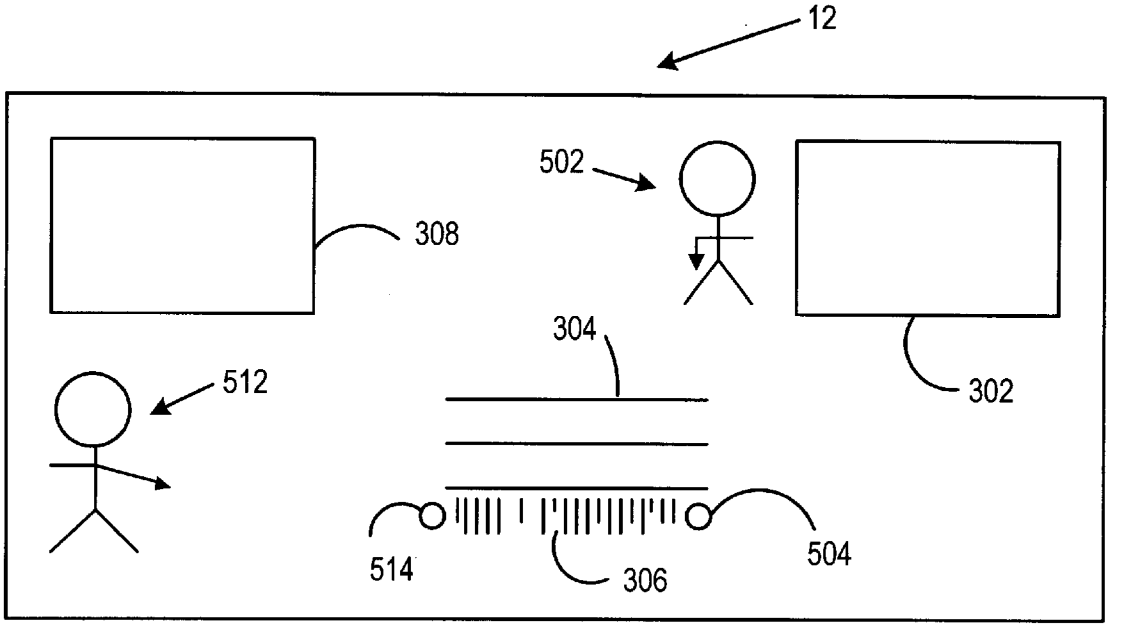

Reference is now made to FIG. 5. A mail piece similar to FIG. 3 is shown; however: in this arrangement, each of the print graphics is oriented with relation to different points or areas on the mail piece. Specifically, print graphics 502 is shown pointing to the trailing edge 504 of the post net bar code while the print graphics 512 is shown as pointing to the leading edge 514 of the post net bar code. It should be recognized, of course, that any area on the mail piece could be selected. However, the selection and the relationship of the orientation of the graphics should be discernable to inspection and related to a system of changing graphics included in the postal system.

As a matter of system security it may be determined, for example, that the graphical images should be oriented in a particular way to determine that the imprint has been made by a valid metering system and not changed other than for example weekly, monthly, quarterly, annually or at any other desired time period. This will allow the carrier personnel to become familiar with the particular orientation. Nevertheless, the selection and changing of the graphics is clearly a matter of systems design and choice.

Figure 6:
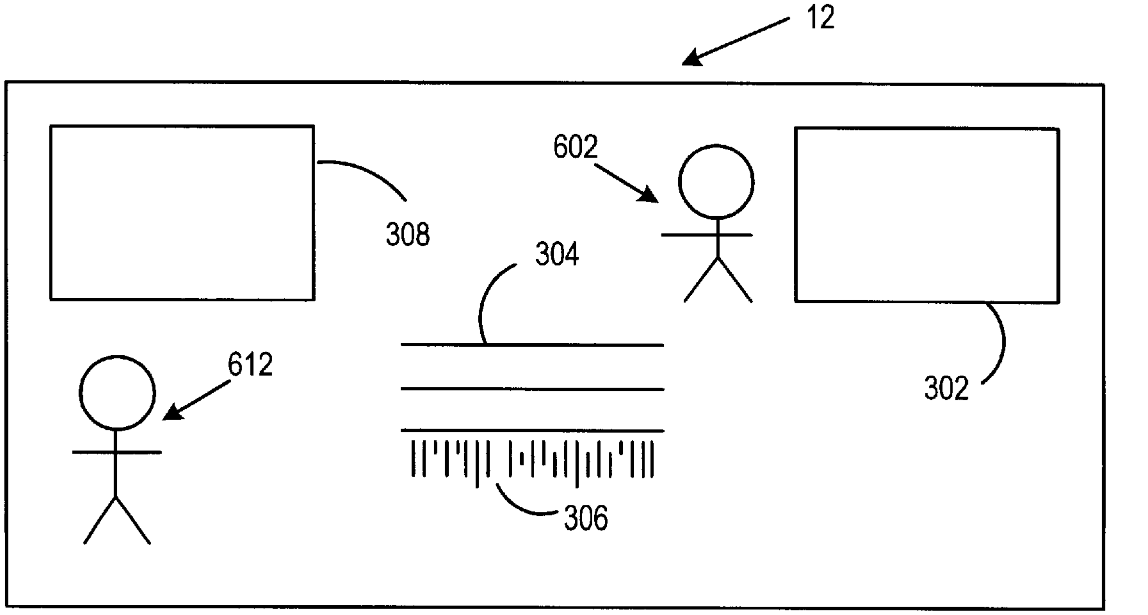

Reference is now made to FIG. 6. A mail piece similar to FIG. 3 is shown: however; FIG. 6 depicts an invalid mail piece where split print graphics 602 and 612 are depicted. In this embodiment, the print graphics do not have the desired relationship to each other, as for example, any of the foregoing relationships described in connection with FIGS. 3, 4 and 5 or that may appear on the relationship indicator. Thus, a mail carrier, for example, could easily detect that this is an improper mail piece which was prepared on an unauthorized or malfunctioning system and flag the mail piece for further investigation.

Figure 7:
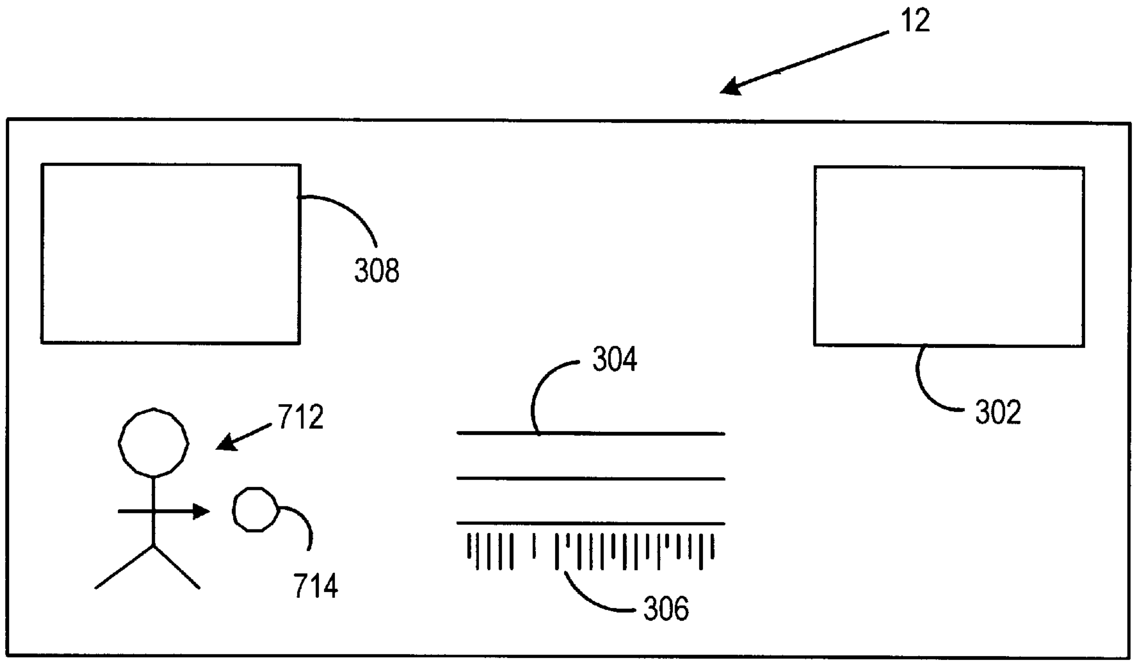
Figure 8:
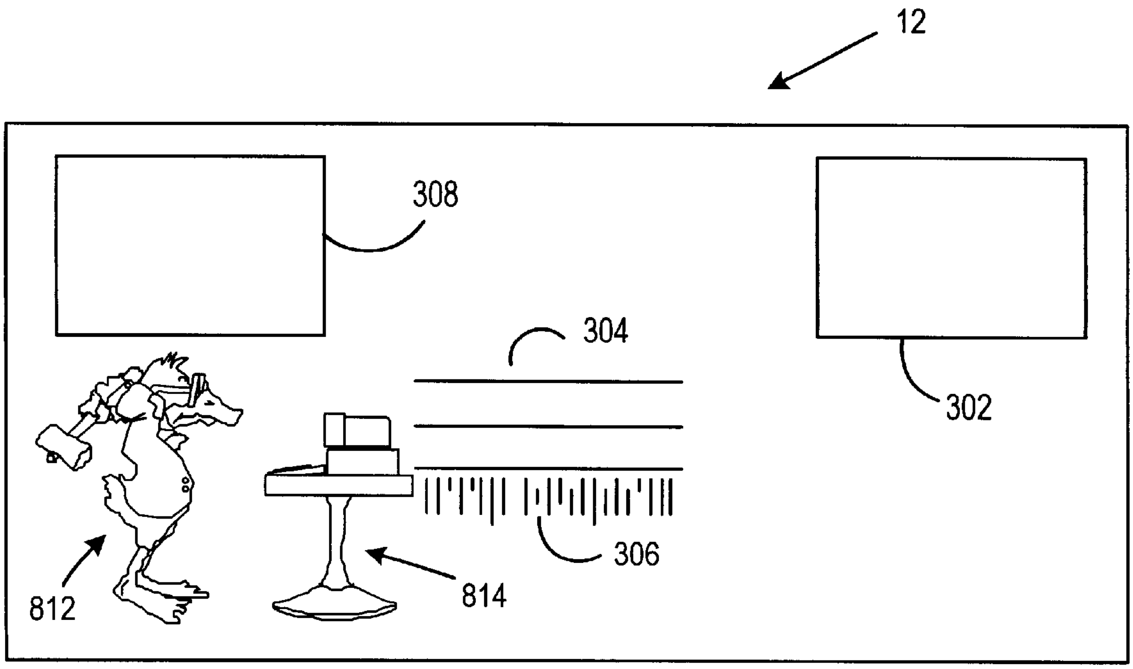

Reference is now made to FIG. 7 and FIG. 8 where a mail piece similar to FIG. 3 is shown. However; FIG. 7 depicts the relationship of single print graphic 712 to spot 714 on the mail piece. As well, FIG. 8 depicts the relationship between print graphic 812 to a second print graphic 814. This illustrates an example of the relationship being cartoon characters. Each of these valid relationships is set forth in a relationship indicator, which would be used by the postal employee during the inspection process.

While the invention has been disclosed and described with reference to a limited number of embodiments, it would be apparent that many variations and modifications may be made therein. For example, various encryption systems, secret key, or public key may be employed as well as, various print graphics and print graphics relationship. It is therefore intended in the following claims to cover each such variation modification as falls within the true spirit and scope of the invention.

What is claimed is:

1. A method for visually detecting an unauthorized document comprising the steps of:

a) generating a document;

b) establishing a first relationship between said document and an indicia;

c) establishing a second relationship between a first print graphic and said indicia;

d) establishing a third relationship based upon said first relationship and said second relationship such that said first print graphic is related to said document;

e) creating a relationship indicator representing said first relationship, said second relationship and said third relationship;

f) visually comparing said generated document to said relationship indicator; and g) authorizing said generated document if said generated document correlates to at least one approval field in said relationship indicator; or if said generated document does not correlate to said at least one approval field in said relationship indicator out sorting said generated document for further investigation.

2. The method of claim 1 wherein said first relationship is a digital token.

3. The method of claim 1 wherein said indicia comprises one or more variables.

4. The method of claim 3 wherein said print graphic is a dependency upon said one or more variables.

5. The method of claim 1 wherein said print graphic is dependent upon a predetermined location on said document.

6. The method of claim 1 wherein said print graphic is dependent on a predetermined second print graphic.

7. The method of claim 1 wherein said first print graphic is printed in invisible ink.

8. The method of claim 6 wherein said second print graphic is printed in invisible ink.

9. A method for authorized document value comprising the steps of:

a) establishing a first relationship between a document and a document value;

b) establishing a second relationship between at least one print graphic and said document value;

c) establishing a third relationship between said first relationship and said second relationship wherein said print graphic is related to said document;

d) creating a relationship indicator wherein said relationship indicator further comprises at least one approval field;

e) selecting a field in said relationship indicator based upon said first relationship, said second relationship and said third relationship wherein if said field is an approval field then authorizing said document value.

10. The method of claim 9 wherein said first relationship is a digital token.

11. The method of claim 9 wherein said document value comprises one or more variables.

12. The method of claim 11 wherein said print graphic is a dependency upon said one or more variables.

13. The method of claim 9 wherein said print graphic is dependent upon a predetermined location on said document.

14. The method of claim 9 wherein said print graphic is dependent on a predetermined second print graphic.

15. The method of claim 9 wherein said first print graphic is printed in invisible ink.

16. The method of claim 14 wherein said second print graphic is printed in invisible ink.

17. A system for visually detecting unauthorized document value, said system comprising:

b) a document value; said document value having a first relationship to a document;

a) a first print graphic; said print graphic having a second relationship to said document value; such that a third relationship between said document and said document value is established; and c) a relationship indicator representing said first relationship, said second relationship and said third relationship such that a comparison between said relationship indicator and said document value determines a field; and if said field is an approval field then authorizing said document value, or out sorting said document for further investigation if said field is not an approval field then.

18. A system as defined in claim 17 wherein said first relationship is a digital token.

19. The system of as defined in claim 17 wherein said document value comprises one or more variables.

20. A system as defined in claim 19 wherein said first print graphic is a dependency upon said one or more variables.

21. A system as defined in claim 17 wherein said first print graphic is dependent upon a predetermined location on said document.

22. The system of claim 17 wherein said print graphic is dependent on a second predetermined second print graphic.

23. A system as defined in claim 17 wherein said first print graphic is printed in invisible ink.

24. A system as defined in claim 22 wherein said second print graphic is printed in invisible ink.

25. A program device readable by a machine, tangibly embodying a program of instructions executable by the machine to perform method steps for verifying the authenticity of an indicia, said method steps comprising:

a) generating a document;

b) establishing a first relationship between said document and an indicia;

c) establishing a second relationship between a first print graphic and said indicia;

d) establishing a third relationship based upon said first relationship and said second relationship such that said first print graphic is related to said document;

e) creating a relationship indicator representing said first relationship, said second relationship and said third relationship;

f) visually comparing said generated document to said relationship indicator; and g) authorizing said generated document if said generated document correlates to at least one approval field in said relationship indicator; or if said generated document does not correlate to said at least one approval field in said relationship indicator out sorting said generated document for further investigation.

* * * * *